United States Patent [19]

Emerson et al.

[11] Patent Number: 5,301,207
[45] Date of Patent: Apr. 5, 1994

[54] TEST APPARATUS AND PROCESS FOR DIGITAL DATA SERVICE SYSTEM

[75] Inventors: Earl Emerson, Somerset; Craig A. Sharper, Bridgewater, both of N.J.

[73] Assignee: Integrated Network Corporation, Bridgewater, N.J.

[21] Appl. No.: 863,243

[22] Filed: Apr. 3, 1992

[51] Int. Cl.⁵ ............................................. H04B 3/46
[52] U.S. Cl. ........................................ 375/10; 375/95; 370/13; 370/15
[58] Field of Search .................... 375/10, 95; 370/13, 370/15, 99; 340/825.05, 825.06

[56]  References Cited
U.S. PATENT DOCUMENTS

| | | | |
|---|---|---|---|
| 4,213,007 | 7/1980 | Funk | 375/10 |
| 4,428,076 | 1/1984 | Schuon | 375/10 |
| 4,862,480 | 8/1989 | Gupta | 375/37 |
| 4,949,355 | 8/1990 | Dyke et al. | 375/10 |
| 5,166,923 | 11/1992 | Ohmori et al. | 370/15 |

*Primary Examiner*—Curtis Kuntz
*Assistant Examiner*—T. Ghebretinsae
*Attorney, Agent, or Firm*—Hamilton, Brook, Smith & Reynolds

[57]  ABSTRACT

Loop circuits lacking byte alignment are tested by test equipment signals at 9.6 kbps transmitted over a DSφ format 19.2 kbps communication network. Upon indication of loss of 19.2 kbps framing, return signals from the loop are reformatted into a 9.6 kbps format by selecting proper return bytes using a logic system stored in an office channel unit (OCU).

19 Claims, 5 Drawing Sheets

TEST APPARATUS AND PROCESS FOR DIGITAL DATA SERVICE SYSTEM

BACKGROUND OF THE INVENTION

The growth in personal computing coupled with the availability of low-cost digital network services has led to significant increases in user demand for high-speed digital connectivity. Of particular interest to personal computer users is connectivity at one of the newest available data rates of 19.2 kbps. Almost all existing personal computers can readily utilize digital 19.2 kbps service with little or no additional software or hardware investment.

From a service provider's perspective, the growth in use of 19.2 kbps connectivity requires a thorough support plan that includes testing and maintenance of local loops. For a typical four-wire circuit, testing of local loops is performed by so-called loopbacks, in which test signals from a common network test center are transmitted as data bytes to an office channel unit (OCU) and from there, over the local 4-wire loop to a customer channel unit (CSU) at the customer premises equipment (CPE). For testing purposes, the signal received at the CPE is immediately returned back to the test equipment by the CSU; hence, the term "loopback." Two different types of loopback tests are performed, "non-latching" and "latching" loopbacks. Non-latching loopbacks are so labelled because the loopback is sustained by the test system transmitting a loopback code at least every other byte interval. Typically, testing is performed by interleaving random test data and loopback codes on an alternating basis and monitoring the results.

Latching loopback testing is implemented in a different fashion. A latching loopback, once activated, using unique sequence of codes, remains in place until a latching loopback release sequence is transmitted by the test system. The use of latching loopback then will allow the test system to send a continuous random sequence without the need to interleave a loopback code to sustain the loopback. Latching loopbacks are often used to perform long term stress tests. Several different stress patterns are currently defined and used as part of current digital testing. These include pseudo-random patterns of 2047 and 511 and DDS stress patterns 1-4.

Typically, all network services, including 19.2 kbps, are tested from a common test center using standard test equipment. Using test equipment that has been upgraded to include test procedures specific to 19.2 kbps will provide more than adequate test support for both latching and non-latching loopbacks. However, the test systems of all network service providers have not been upgraded to include 19.2 kbps capability. Under these circumstances, a need exists for an alternative test procedure and apparatus to provide the necessary test and maintenance support for a 19.2 kbps service operable with test equipment which has not been upgraded.

DISCLOSURE OF THE INVENTION

This disclosure describes a method and apparatus for using 9.6 kbps test capability that exists in all test systems to permit testing of 19.2 kbps services.

In accordance with the invention, a method and apparatus is provided for testing circuits lacking byte alignment and operating at a first frequency, i.e, 19.2 kbps, using test equipment operating at half the rate of the first frequency, i.e., 9.6 kbps. A test unit, operating at the half-rate, sends test signals which are formed into bit frames of bytes of a predetermined bit length and wherein the bytes are repeated X times per frame. A consecutive series of n bits in a byte are data bits and they occupy n bit positions; $B_0$---$B_n$.

A channel unit receives the test signals and selects a plurality of successive bytes from each frame for transmission over the loop circuit for testing the loop circuit. The returned bits are then analyzed by the channel unit for any bit rotation caused by lack of byte alignment in the loop circuit. The test criteria is satisfied by selecting a number of successive bytes of returned data bits from successive frames and comparing bits in predetermined bit positions of the selected bytes to determine which of the selected bytes has an identical bit in the predetermined bit position. The first byte in time of the group with identical bit position value meeting this criteria is then repeatedly transmitted back to the test equipment X times per frame. Subsequent bytes are then transmitted X times to the test equipment for the duration of the test. Preferably, bit position six is selected as the predetermined bit position. Bit position one will also satisfy the test, but then the second byte in time which meets the criteria should be repeatedly transmitted back to the test equipment.

For a 19.2 kbps system, the test equipment frequency is 9.6 kbps and the bit frame is 40 bits in length with a byte repeat of five. The number of data bits (DB) in a byte is six and the bit positions are $n_6$---$n_1$. The number m of successive bytes transmitted by the channel unit is two and three (m+1) successive bytes of returned data is used for determining which bytes to repeat to satisfy the test criteria.

DETAILED DESCRIPTION OF THE INVENTION

Figure 1:
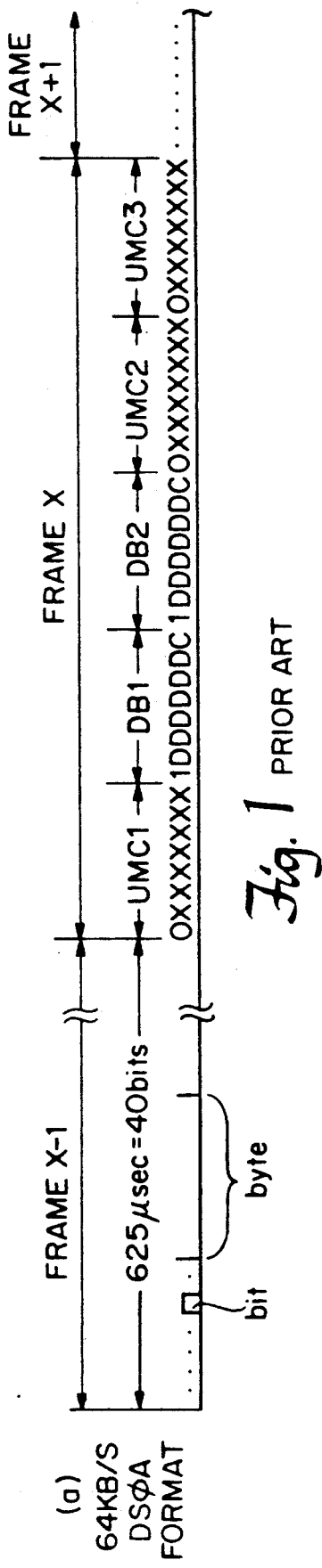
FIG. 1 is a timing diagram showing the time slots allotted in prior art for data service using a DSφ-A format at 64 19.2 KB/s.
Figure 3:
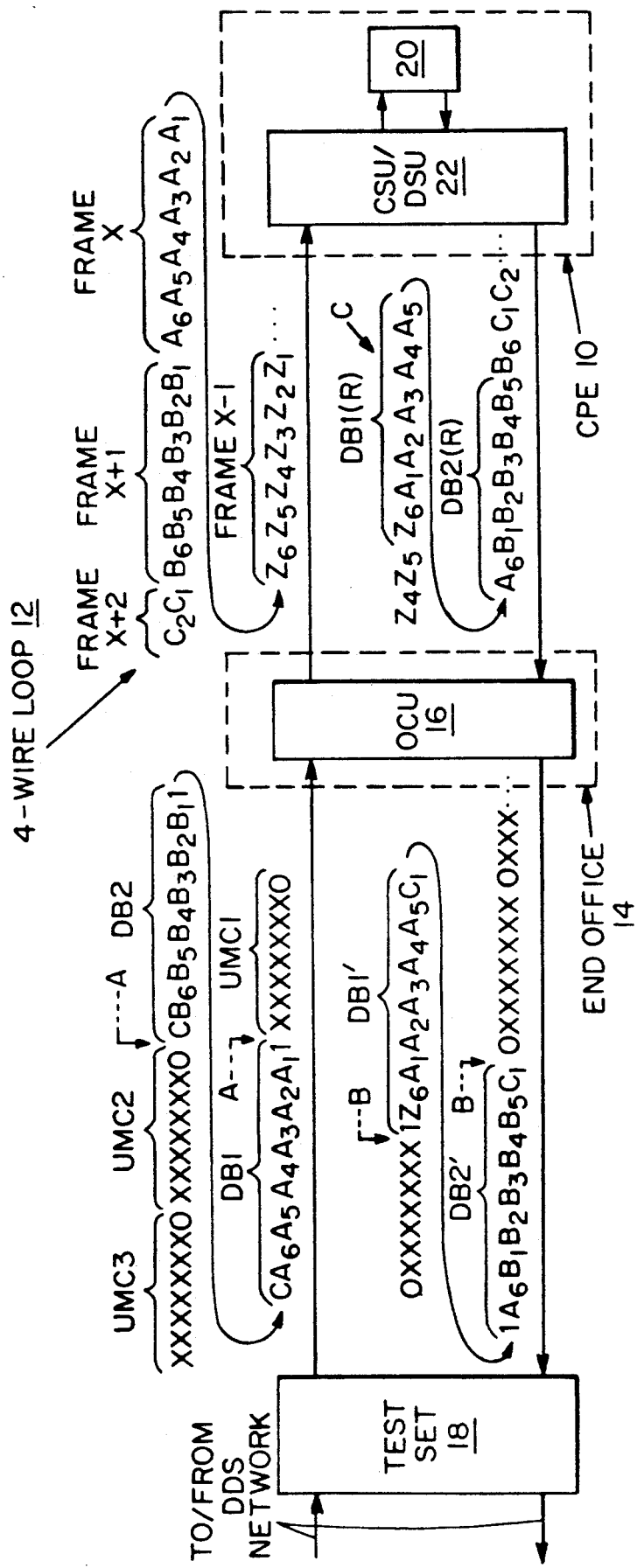
FIG. 3 is a block diagram of the typical architecture of a DDS End Office TDM digital data service DDS system when testing the customer premises equipment through an OCU and CSU provisioned for 19.2 KB/s testing and illustrating the data format for such architecture.

FIG. 1 shows the standard 19.2 kbps frame format as defined in U.S. Pat. No. 4,862,480 by D. Gupta and incorporated herein in its entirety by reference. A 19.2 kbps frame, consists of 40 bits divided into 5 bytes of 8 bits length. Bytes 2 and 3 of the five-byte frame contain customer data bytes DB1, DB2 during normal data transmission. The customer data is sent in bit positions 2-7 of bytes 2 and 3, bit position 1 contains a framing bit and bit position 8 a control bit. For loopback maintenance testing, customer data is not transmitted and bytes 2 and 3 contain the loopback codes and the test patterns during the test period. Note, however, that for purposes of simplification, the bits in bit positions 2-7 will generally be called data bits herein. Standard loopinterface equipment (such as an OCU dataport) is used to transmit and receive information over the loop to the customer equipment (normally a CSU/DSU), as shown in FIG. 3. If either of the two bytes DB1 or DB2 are control code bytes (e.g., loopback control codes), the standard control code to loop mappings defined in Bellcore TA-TSY-000077 are used to produce the appropriate loop code.

Figure 2:
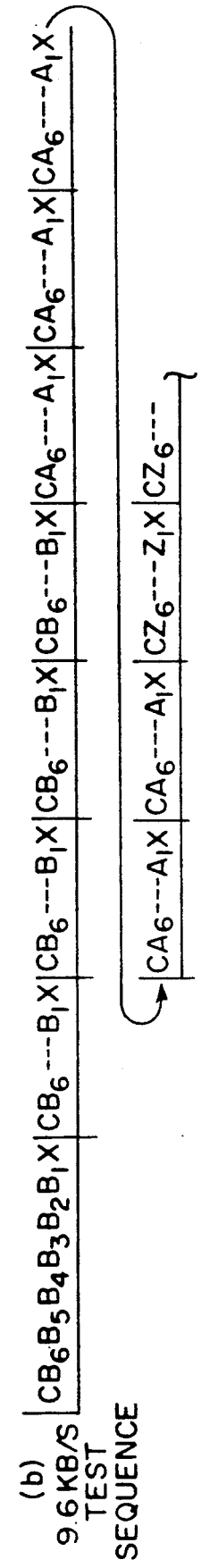
FIG. 2 is a timing diagram showing the 9.6 KB/s test sequence used in the prior art for loop-back signaling through an OCU.

By way of contrast, the 9.6 kbps format for transmission in DS$\phi$ format is shown in FIG. 2 in which the frame again consists of 40 bits of 5 bytes, each byte consisting of 8 bits, of which bit positions 2-7 comprise data bits, bit position 8 is a control bit and bit position 1 is unassigned (a don't care). Note that each byte is repeated five times per frame.

Referring to FIG. 3, with non-secondary channel mode of operation, byte alignment is not guaranteed over the local loop. That is, if data bytes DB1 and DB2 of a 19.2 kbps frame are comprised of A1-A6 and B1-B6 respectively at (A) from test system 18 in the bit stream, and are transmitted by OCU 16 onto the local loop 12 to CSU/DSU 22 and returned by the same route directly to the network test equipment 18, these bits will be received in the appropriate order but may not be contained in bytes DB1' and DB2' in the DSO-A format at (B).

An example is shown in FIG. 3 where a single bit rotation occurs on the loop. Data bits DB1, consisting of bits $A_6$---$A_1$, and data bits DB2, consisting of data bits $B_6$---$B_1$ are sent by OCU 16 to CSU/DSU 22. Assume that byte alignment is lost and the bits are rotated in the loop circuit by one rotation. In this case, a bit $Z_o$ from the previous frame X-1 would appear in bit position one of the return data bytes DB1(R), as shown at (C). When formatted by OCU 16 for 19.2 kbps DS$\phi$ transmission DB1(R) is shown as DB1' at (B).

Rotations of zero to five bits are possible. Note that all bits sent are returned. Only the grouping of the bits into bytes (i.e. DB1' and DB2') may be different. Since all bits sent are returned in the proper order, testing at 19.2 kbps with 19.2 kbps test equipment can proceed successfully, despite bit rotation in the loop circuit.

However, when testing a circuit configured for 19.2 kbps with 9.6 kbps test procedures, because 19.2 kbps test equipment is unavailable, several factors arise. For example:

1. The 9.6 kbps test sequence will not contain the 19.2 kbps framing format.

2. The 9.6 kbps test sequence will be sent by the test system with the standard 9.6 kbps five-byte repeating pattern shown in FIG. 2.

3. The impact of bit rotation on the local loop must be considered and action taken to guarantee that test systems receive a valid response.

4. Non-latching and latching loopbacks may be transmitted.

The first issue above can be overcome by an OCU 16' that, upon loss of 19.2 kbps framing, continues to select two bytes from the previous bytes positions used as DB1 and DB2. Since a 9.6 kbps test set 18, will send a five-byte repeating pattern, the OCU will choose two of these five bytes as the DB1 and DB2 bytes. Since the sequence sent by the test system is a five byte repeating pattern selection of any two of these five bytes will produce the same result. If these five bytes are loopback codes, then the OCU will detect two consecutive loopback codes as it would if a framed 19.2 kbps signal were transmitted. Upon detection of a valid loopback code sequence, the OCU will proceed with normal loopback procedure. Use of this procedure guarantees that the OCU 18' is successful in recognizing maintenance codes.

Figure 4:
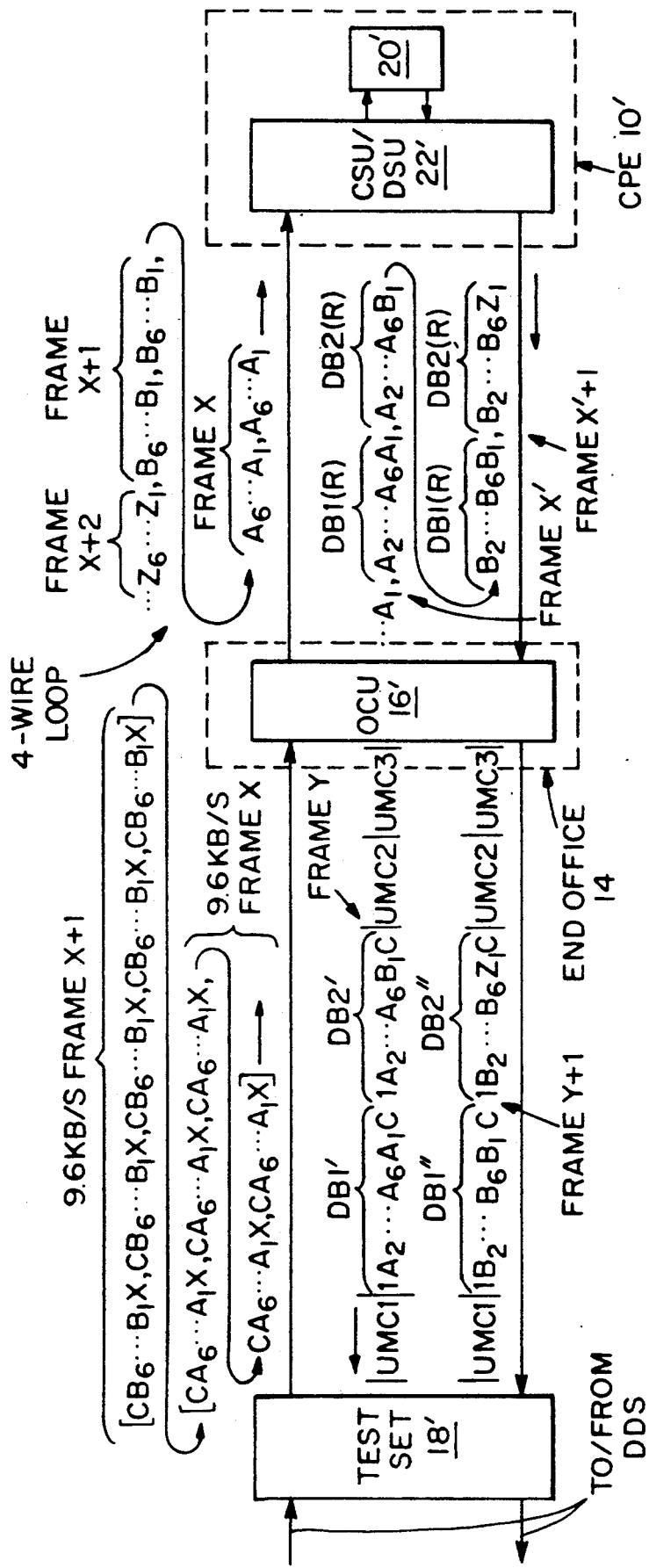
FIG. 4 is a block diagram of the system of FIG. 3 illustrating the format for testing using the 9.6 KB/s format of the invention.

The impact of bit rotations must be considered next. FIG. 4 shows an example of a sequence of data sent from a 9.6 kbps test set 18' through an OCU 16' to CSU/DSU 22' in CPE 10' and back from end user equipment 20' toward the test set. The 9.6 kbps test system will pick one of every five bytes returned to perform its test verification.

The test system performs verification of a loopback by examining every fifth byte received and comparing the contents of these bytes with the test sequence transmitted. If the contents of consecutive bytes are found to contain the expected test sequence, the test system will indicate a successful test. Note that the test system begins its examination of the returned bytes by randomly selecting a byte and selecting every fifth byte afterward. Therefore, successful testing requires that selection of all starting byte positions for the test system produce the same results.

FIG. 4 illustrates the case of a single bit rotation. Note that, since the test system is configured for 9.6 kbps, five 8-bit bytes are transmitted, per frame, from the test system, and each are identical. The OCU 16' selects two of the data bytes per frame $A_6$---$A_1$, $A_6$---$A_1$ (frame X) and $B_6$---$B_1$, $B_6$---$B_1$ (frame X+1), etc. for transmission to the CSU/DSU 22'. Assume that the return frames X' and X'+1 have a bit rotation of one position, as shown in the bit stream from CSU/DSU 22' to OCU 16', wherein Z1 is the bit in bit position one of the first byte of frame X+2.

This bit rotation causes the sequence of data bits DB1', DB2', DB1'', DB2'', returned to the test system from the OCU. Note that the sequence returned to the test system is still in the 19.2 kbps frame format with bit positions 2-8 of bytes 1, 4 and 5 having arbitrary values. It may be desirable to implement the repetition option of 19.2 kbps as defined in U.S. Pat. No. 4,862,480 where bytes 3 of the 19.2 kbps frame format is repeated in the subsequent three bytes.

However, even if the byte repetition system of the '480 patent is used, bytes DB1' and DB2', of frame Y of the 19.2 kbps DS$\phi$ frame format from the OCU 16' to the test set 18' are different, and only one will result in the test system delivering a successful test.

If byte position DB1' is selected by the test system, the test will result in a failure. This can be seen by taking the contents of DB1' in frames Y (DB1') and Y+1 (DB1'') in series as shown below:

$A_2A_3A_4A_5A_6A_1B_2B_3B_4B_5B_6B_1$

Note that bit A1 appears in an unexpected location (between A6 and B2) and will cause the test system to log an error. This pattern will continue for all DB1 bytes and the test system will declare a failure.

If the contents of DB2 in frames Y (DB2') and Y+1 (DB2'') are taken in series, the test will be passed, as shown below:

$A_2A_3A_4A_5A_6B_1B_2B_3B_4B_5B_6Z_1$

Where $Z_1$ is the first bit of the next DB2 byte from frame X+2.

This sequence is valid, since all bits are in the expected order. Therefore, if the test system selected this byte, the test will pass. Note that the fact that the desired result occurred in DB2' was only a result of the particular example under consideration. It is also possible that the desired sequence could have been found in DB1' instead.

Inspection of this result indicates that either DB1 or DB2 from each frame will contain a valid sequence that will satisfy a 9.6 kbps test system. A method has been found that enables identification of which byte is the correct one. The logic behind this method is used to reformat the frame into a five byte repeated frame with the correct byte repeated five times so that the test system will be satisfied.

Figure 6:
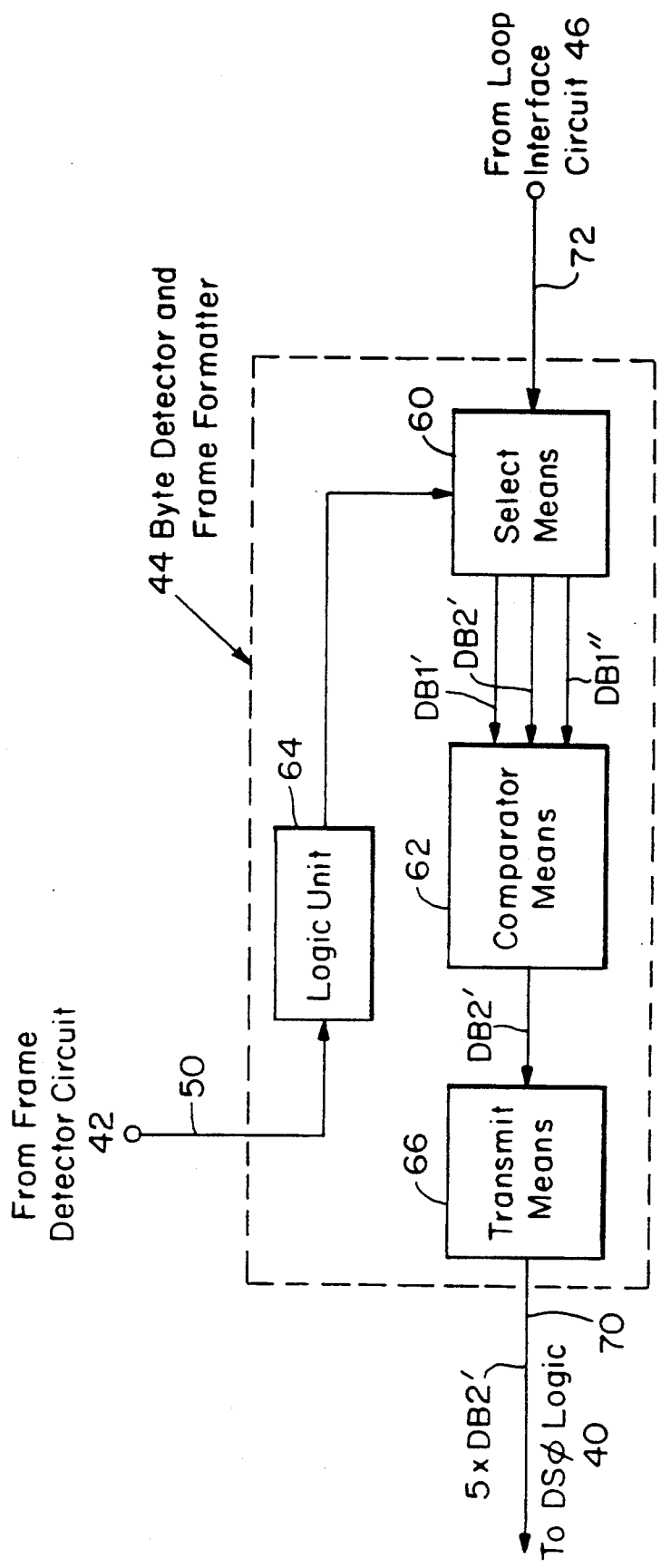
FIG. 6 is a block diagram of circuitry of the byte detector and frame formatter 44 of FIG. 5.

In accordance with the method, three consecutive DB bytes e.g., (DB1' DB2' from frame Y and DB1" from frame Y+1) as shown in FIG. 6 or (DB2' from frame Y and DB1" DB2" from frame Y+1) as shown in FIG. 6 are selected by select means 60 of byte detector and frame formatter 44 and the six data bits of each byte are extracted for bit position comparison in comparator means 62. More specifically, for example, bit position six of each six-bit grouping is compared to find two of three bytes that have bit six identical. If the first in time of the two bytes with bit six identical is repeated five times (and every fifth byte after), then a successful test will result.

This can be illustrated using FIG. 4 as an example. Three six-bit data groups are shown below wherein bit position six is identical in DB2' and DB1".

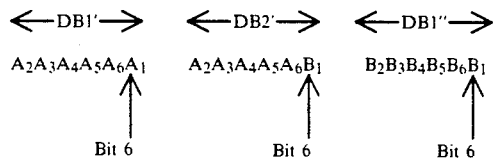

By using the method defined above, the DB2' byte containing $A_2A_3A_4A_5A_6B_1$ would be repeated five times. The next byte to be repeated is $B_2B_3B_4B_5B_6Z_1$ from DB2", since this is the 5th byte after the DB2' byte. As was shown earlier in connection with FIG. 3, these bytes are in fact those that would satisfy a 9.6 kbps test system.

Similarly, if the following group of three DB bytes is grouped:

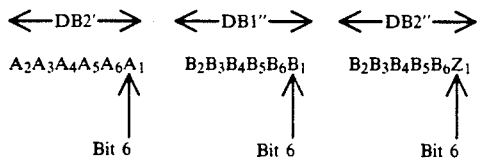

it can be seen that bit six of DB1" is identical to bit six of DB2'; hence, this DB1" byte is repeated five times and sent to the test set.

Using the method described above, the proper sequence is always selected and sent toward the test system.

Note that for cases of fixed byte testing (i.e., when $A_1=B_1$, $A_6=B_6$) selection of either DB1 or DB2 will satisfy the test set since both are identical. The system will pick one of these two bytes until the method stated above is satisfied.

It can also be shown that this method applies for all bit rotations of 0-5 bits and will also work for bit position one, as well as bit position six. However, if bit position one is chosen, then the second byte in time, found to have identical bits in position one, is selected for multiple transmission.

It is desirable that when a properly framed 19.2 kbps signal is received by the OCU, that standard 19.2 kbps procedures are used. However, upon detecting loss of 19.2 kbps framing, it is desirable that the OCU automatically changes to the 9.6 kbps test mode, described above, and implements the above methodology.

Figure 5:
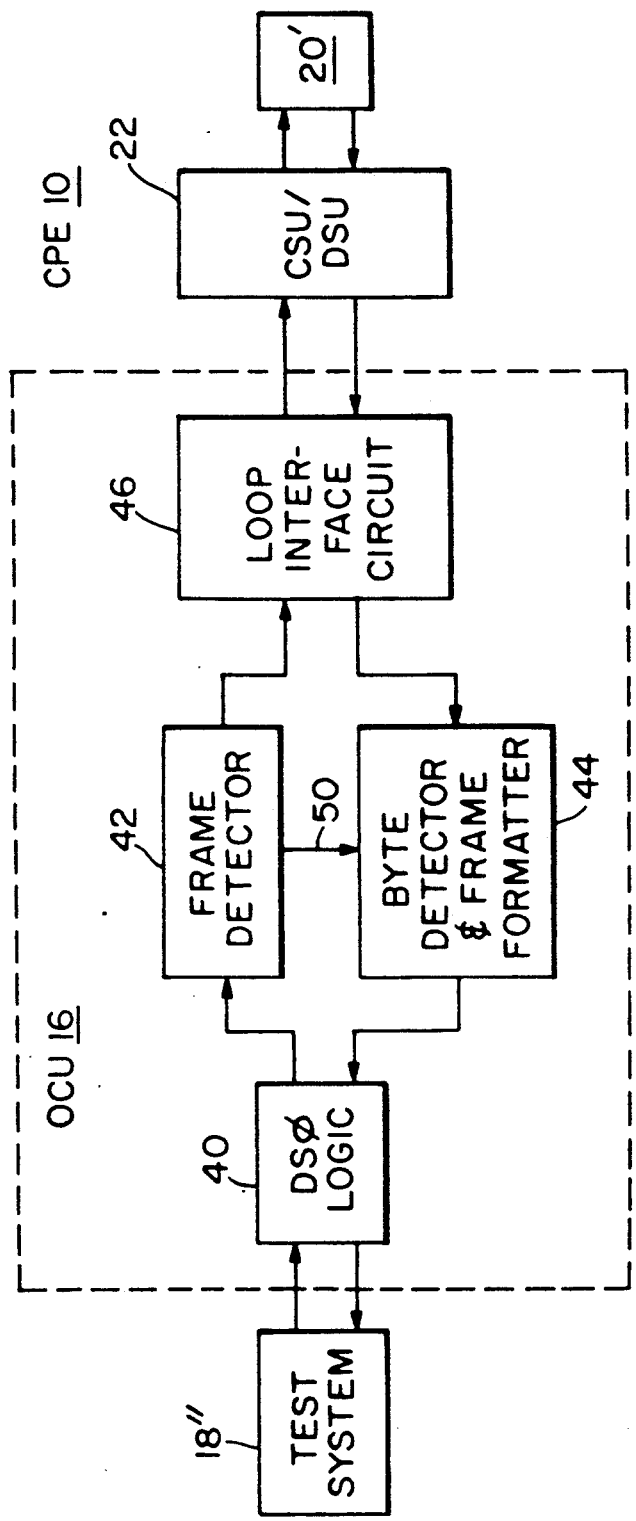
FIG. 5 is a block diagram of circuitry of the invention for supporting testing of 19.2 KB/s circuitry using a 9.6 KB/s format.

FIG. 5 shows a circuit for satisfying this criteria. The circuit shown in FIG. 5 allows test systems with 19.2 kbps capability to test 19.2 kbps circuits using normal procedures. Test system 18" may send one or the other 9.6 kbps test signals or 19.2 kbps test signals to DS$\phi$ logic circuit 40 in OCU 16 for reformatting by loop interface circuit 46 into loop circuit format and transmitted to CSU/DSU 22 in CPE 10. A frame detector circuit 42 detects proper 19.2 kbps frame input. A signal is then sent on line 50 to the byte detector and frame formatter logic unit 64 (see FIG. 6) that indicates that no action should be taken since valid input is being received from the test system 18'.

Upon detection of loss of 19.2 kbps framing, the signal from detector 42 on line 50 to the byte detector and frame formatter logic unit 64 indicates that action should be taken in unit 44 to reformat the output of loop interface circuit toward the test system 18' into a 9.6 kbps format. Select means 60 in conjunction with comparator means 62 selects the proper return byte i.e., DB2' for transmittal by transmit means 66 five consecutive times, using the method described above, the logic for which is stored in circuit 44. This method of operation will allow automatic testing of 19.2 kbps circuits with 19.2 kbps test sets or 9.6 test sets without requiring manual intervention to reconfigure the circuit.

By implementing the method of the invention in an OCU DP, the following tests can be conducted properly.

1. OCU nonlatching loopback.
2. CSU nonlatching loopback.
3. DSU nonlatching loopback.
4. OCU latching loopback with stress patterns of 2047, 511, DDS stress patterns 1-4 and fixed-byte testing.
5. CSU latching loopback with stress patterns of 2047, 511, stress patterns 1-4 and fixed-byte testing.
6. DSU latching loopback with stress patterns of 2047, 511, stress patterns 1-4 and fixed-byte testing.
7. Manual CSU/DSU loopbacks with stress patterns 4057, 511, stress pattern 1-4 and fixed byte testing.

The method permits testing of latching and nonlatching loopbacks, since no information about the value of particular bytes or bits is necessary for testing. Only a comparison of bit positions is required, which is independent of the test being performed. Therefore, bit rotations will always be addressed independent of the type of test.

Equivalents

While the invention has been described in connection with specific methods and apparatus, it is to be understood that the description is by way of example and not as a limitation to the scope of the invention as set forth in the claims.

We claim:

1. Apparatus for testing loop circuits lacking byte alignment from a network operating at a frequency F1 and using test equipment operating at a frequency of F1/2 comprising:
   a) a test unit for transmitting test signals at the rate of F1/2 and wherein said test signals are framed into Y bit frames of X bytes of L bit length and wherein the same X bytes are transmitted X times per frame and wherein a consecutive series of n bits, each n bit occupying an n bit position in a byte are data bits; and
   b) a channel unit for receiving said test signals and selecting M successive bytes from each said frame for transmission of said data bits of said successive bytes over the loop circuit for testing the loop circuit and return of said data bits to said channel unit;
   c) reformatting means for reformatting the data bits returned from the loop circuit and compensating for any bit rotation caused by lack of byte alignment in the loop, comprising:
      (i) selecting means for selecting at least M+1 successive bytes from the returned data bits; and
      (ii) comparing means for comparing bits from a predetermined one of said bit positions of each of the M+1 successive bytes and determining which bytes of the M+1 bytes has identical bits in the predetermined bit position;
      (iii) transmitting means for repeatedly transmitting one of the M+1 bytes with an identical bit in the predetermined bit position and wherein L, Y and M are integer numbers.

2. The apparatus of claim 1 wherein F1 is 19.2 kbps.

3. The apparatus of claim 2 wherein n is 6 and M is 2.

4. The apparatus of claim 2 wherein the predetermined bit position is 6 and X is 5 and the first in time of the selected M+1 successive bytes from the returned data bits with an identical bit in the sixth bit position is transmitted.

5. The apparatus of claim 2 wherein the predetermined bit position is 1 and X is 5 and the second in time of the selected M+1 successive bytes from the returned data bits with an identical bit in the first bit position is transmitted.

6. A method for testing loop circuits lacking byte alignment from a network operating at a frequency F using test signals at a frequency F/2 comprising the steps of:
   a) transmitting test signals at said frequency F/2 and wherein said test signals are framed into Y bit frames of X bytes of L bit length and wherein the same X bytes are transmitted X times per frame and wherein a consecutive series of n bits occupy respective n bit positions in a byte and are data bits; and
   b) receiving said test signals and selecting M successive bytes from each said frame for transmission of said data bits of said M successive bytes over the loop circuit for testing the loop circuit and return of said data bits to said channel unit;
   c) reformatting the data bits returned from the loop circuit and compensating for any bit rotation caused by lack of byte alignment in the loop by selecting at least M+1 successive bytes from the returned data bits; and comparing bits from a predetermined one of said bit positions of each of the M+1 successive bytes and determining which bytes of the M+1 bytes has identical bits in the predetermined bit position; and transmitting one of the bytes with identical bits in the predetermined bit position X times.

7. The method of claim 6 wherein F is 19.2 kbps.

8. The method of claim 7 wherein Y=40, X=5 and n=6.

9. The method of claim 8 wherein M=2 and L=8 and the predetermined bit position is six and the byte transmitted is the first in time of the M+1 successive bytes selected.

10. The method of claim 8 wherein M=2 and L=8 and the predetermined bit position is one and the byte transmitted is the second in time of the M+1 successive bytes selected.

11. Apparatus for testing loop circuits lacking byte alignment from a network operating at 19.2 kbps using test signals at 9.6 kbps comprising:
   a) a test unit for transmitting test signals at said frequency of 9.6 kbps and wherein said test signals are framed into 40 bit frames of 5 bytes of 8 bit length and wherein the same 5 bytes are transmitted 5 times per frame and wherein a consecutive series of 6 bits occupying 6 bit position in a byte are data bits; and
   b) a channel unit for receiving said test signals and selecting 2 successive bytes from each said frame for transmission of said data bits of said 2 successive bytes over the loop circuit for testing the loop circuit and return of said data bits to said channel unit;
   c) reformatting means for reformatting the data bits returned from the loop circuit and compensating for any bit rotation caused by lack of byte alignment in the loop, comprising:
      (i) selecting means for selecting at least three successive bytes from the returned data bits; and
      (ii) comparing means for comparing bits from a predetermined one of said bit positions of each of the three successive bytes and determining which two bytes of the three bytes has identical bits in the predetermined bit position; and
      (iii) transmitting means for transmitting, five times, one of the two bytes with an identical bit in the predetermined bit position.

12. The method of claim 11 wherein the predetermined bit position is position one and the byte transmitted is the second in time of the successive bytes selected from the return data bits.

13. The method of claim 11 wherein the predetermined bit position is position six and the byte transmitted is the first in time of the successive bytes selected from the return data bits.

14. The method of claim 11 wherein the test unit compares the test signals transmitted with every fifth byte of a randomly selected train of bytes returned to determine if they are identical.

15. Apparatus for testing loop circuits lacking byte alignment from a network operating at 19.2 kbps using test signals at 9.6 kbps comprising:
   a) a test unit for transmitting test signals at said frequency of 9.6 kbps and wherein said test signals are framed into 40 bit frames of 5 bytes of 8 bit length and wherein the same 5 bytes are transmitted 5 times per frame and wherein a consecutive series of 6 bits occupying respective 6 bit positions in a byte are data bits; and b) a channel unit for receiving said test signals and selecting 2 successive bytes from each said frame for transmission of said data bits of said 2 successive bytes over the loop circuit for testing the loop circuit and return of said data bits to said channel unit;

c) a format means for reformatting the data bits returned from the loop circuit and compensating for any bit rotation caused by lack of byte alignment in the loop circuit by selecting at least three successive bytes from the returned data bits; and comparing bits from a predetermined one of said bit positions of each of the three successive bytes and determining which two bytes of the 3 bytes has identical bits in the predetermined bit position; and transmitting the first in time of two bytes with identical bits in the predetermined bit position five times.

16. The apparatus of claim 15 wherein the predetermined bit position is position one and the byte transmitted is the second in time of the successive bytes selected from the return data bits.

17. The apparatus of claim 15 wherein the predetermined bit position is position six and the byte transmitted is the first in time of the successive bytes selected from the return data bits.

18. The apparatus of claim 15 wherein the test unit performs a latching loopback test.

19. The apparatus of claim 15 wherein the test unit performs a non-latching loopback test.

* * * * *

UNITED STATES PATENT AND TRADEMARK OFFICE
CERTIFICATE OF CORRECTION

PATENT NO. : 5,301,207
DATED : April 5, 1994
INVENTOR(S) : Earl Emerson, et al.

It is certified that error appears in the above-identified patent and that said Letters Patent is hereby corrected as shown below:

On the title page, column 1, add Kyung-Yeop Hong, Somerville, N.J., as the third named inventor.

Signed and Sealed this

Thirtieth Day of August, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,301,207
DATED : April 5, 1994
INVENTOR(S) : Earl Emerson, Craig A. Sharper and Kyung-Yeop Hong It is certified that error appears in the above-identified patent and that said Letters Patent is hereby corrected as shown below:

Column 5, line 55, change "$A_2A_3A_4A_5A_6A_1$" to ---$A_2A_3A_4A_5A_6B_1$---.

Column 5, line 61, change "$DB1''$" to ---$DB2'$---.

Signed and Sealed this

Sixth Day of December, 1994

BRUCE LEHMAN

Attest:

Attesting Officer

Commissioner of Patents and Trademarks